Jan. 23, 1962

F. H. BUSCH ET AL 3,018,356

TEMPERATURE CONTROL SYSTEMS

Filed Aug. 24, 1960

INVENTORS
Floyd H. Busch
Fred H. Sawada

BY

Attys.

FIG. 3

INVENTORS
Floyd H. Busch
Fred H. Sawada
BY
Prangley, Baird, Clayton,
Miller & Vogel
Attys.

INVENTORS
Floyd H. Busch
Fred H. Sawada
BY
Attys.

FIG. 5

United States Patent Office 3,018,356
Patented Jan. 23, 1962

3,018,356
TEMPERATURE CONTROL SYSTEMS
Floyd H. Busch, Flossmoor, and Fred H. Sawada, Wheaton, Ill., assignors to General Electric Company, a New York corporation
Filed Aug. 24, 1960, Ser. No. 51,633
12 Claims. (Cl. 219—20)

The present invention relates to electric control systems, and more particularly, to improved automatic temperature control systems for electric heating apparatus, and specifically to such automatic temperature control systems for cooking vessels heated by electric heating units or hotplates and particularly of the character disclosed in U.S. Patent No. 2,822,455, granted on February 4, 1958, to Robert J. Molyneaux and Kenneth H. Walkoe.

It is the general object of the present invention to provide an electric control system that comprises a circuit network of simple and economical connection and arrangement involving a minimum number of individual conventional elements.

Another object of the invention is to provide an automatic temperature control system incorporating an improved circuit network that requires no thermionic tubes or other elements which must be replaced during the normal life of the system.

Yet another object of the invention is to provide an automatic electric control system of the character noted including an improved circuit network that regulates the power provided to the associated electric heater as demanded thereby, power being continuously provided to the heater when required and being indefinitely variable from the full power input to zero power input upon demand.

Still another object of the invention is to provide an automatic temperature control system of the character noted that includes a power relay having power switching contacts for selectively controlling the supply of power to the electric heater, an electric control circuit for selectively controlling the operation of the power relay, and a temperature sensing element controlled by the temperature of the medium being heated for selectively controlling the operation of the electric control circuit.

Further features of the invention pertain to the particular arrangement of the elements of the electric heating apparatus and of the associated control network, whereby the above-outlined and additional operating features thereof are attained.

The invention, both as to its organization and method of operation, together with further objects and advantages thereof, will best be understood by reference to the following specification taken in connection with the accompanying drawings, in which:

Figure 1:
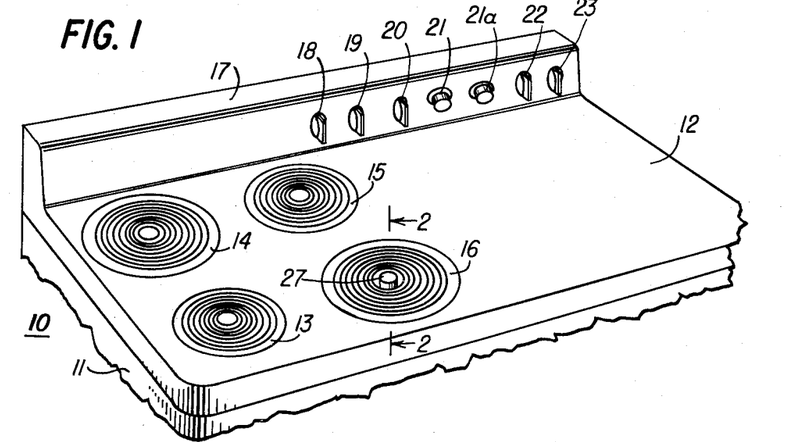
FIGURE 1 is a fragmentary front perspective view of the upper portion of an electric range incorporating therein electric heating apparatus embodying the present invention.

Referring now to FIG. 1 of the drawings, there is illustrated an electric range 10 incorporating electric heating apparatus embodying the features of the present invention and comprising an upstanding body 11 provided with a substantially horizontally disposed cooking top 12 supporting a plurality of surface heating units or hot plates 13, 14, 15 and 16 arranged in spaced apart relationship in a substantially rectangular pattern on the left side thereof; the body 11 houses an oven, not shown, in the right-hand portion thereof, and a compartment, not shown, in the left-hand portion thereof, the oven and the compartment being respectively provided with front doors, not shown. The cooking top 12 carries an upstanding backsplash 17 adjacent to the rear thereof, that in turn, carries a plurality of surface heating unit selector switches 18, 19 and 20, a range control switch 21, a temperature selective control switch 21a, an oven selector switch 22, and an oven regulator or thermostat switch 23, the elements 18 to 23, inclusive, being arranged in a row on the right-hand side of the backsplash 17. The selector switches 18, 19 and 20, respectively, correspond to the surface heating units 13, 14 and 15 are of conventional construction and are respectively included in the electric heating circuits thereof; while the control switches 21a and 21 cooperate with each other and correspond to the surface heating unit 16 of special construction and are included in the electric heating circuit thereof. Each of the surface heating unit selector switches 18, 19 and 20 and the oven selector switch 22 as well as the thermostat switch 23 are of conventional construction and arrangement.

The cooking top 12 has a plurality of openings therein that respectively receive the electric heating units 13, etc.; and each of the electric heating units 13, 14 and 15 may be fundamentally of the construction disclosed in U.S. Patent No. 2,565,443, granted on August 21, 1951, to Oliver G. Vogel and Francis E. Kirk; while the surface heating unit 16 is of the special construction disclosed in the previously mentioned Molyneaux and Walkoe patent.

The surface heating unit 16 is of the hotplate type and is mounted for pivotal movements in the associated opening provided in the cooking top 12 by mechanism, not shown, that is preferably of the construction of that disclosed in U.S. Patent No. 2,565,432, granted on August 21, 1951, to Francis E. Kirk. More particularly, referring to FIG. 2, the heating unit 16 comprises a spider 24 carrying a heating element L including respective inner and outer sections La, Lb, only a portion of the inner section La being illustrated. The heating element L is generally in the form of a helical coil or spiral, the turns of which are arranged in radially spaced-apart relation; and preferably the heating element L is of the metal sheath-helical resistance conductor type disclosed in U.S. Patent No. 1,367,341, granted on February 1, 1921, to Charles C. Abbott. The spider 24 comprises a substantially centrally disposed upstanding ring 26, the coils of the heating element L being selectively staked to the arms of the spider 24 in the general manner disclosed in the Vogel and Kirk patent mentioned. The top surfaces of the coils of the heating element L are flattened to define a substantially horizontal plane adapted to engage and to support the bottom wall of a cooking vessel, or the like, not shown.

Figure 2:
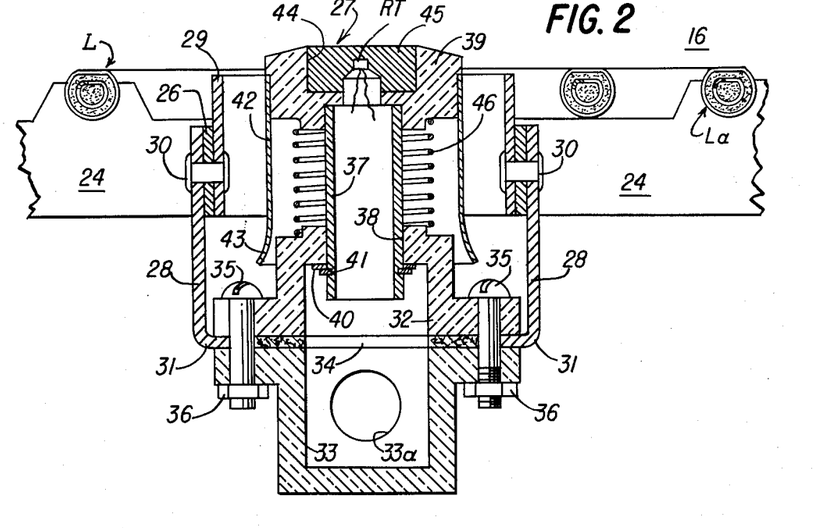
FIG. 2 is a greatly enlarged fragmentary vertical sectional view of one of the electric heating units or hotplates incorporated in the electric range, taken in the direction of the arrows along the line 2—2 in FIG. 1, illustrating the construction of the temperature sensing unit incorporated therein and forming a part of the electric control circuit.

The hotplate 16 carries a temperature sensing unit 27 within the central ring 26 that is adapted to engage the bottom wall of the cooking vessel, or the like, supported upon the heating element L; and more particularly, a pair of opposed depending arms 28 is arranged exteriorly of the central ring 26 and an upstanding tubular heat shield 29 is arranged interiorly of the central ring, the arms 28 and the heat shield 29 being retained in place by a special pair of rivets 30. The arms 28 terminate in inwardly directed flanges 31 disposed below the central ring 26 that carry upper and lower substantially cup-shaped housings 32 and 33 formed of lava or the like. The upper housing 32 is arranged in inverted position and constitutes a supporting base, the housings 32 and 33 being retained in place upon the flanges 31, with an asbestos ring 34 clamped therebetween by removable screws 35 provided with cooperating nuts 36. An upstanding tubular member 37 is slidably mounted in a cooperating opening 38 provided in the top of the base 32, the upper end of the tubular member 37 carrying an insulating ring 39 formed of lava, or the like, and arranged within the heat shield 29 in spaced relationship with respect thereto. The tubular member 37 is retained in place by an arrangement including a surrounding washer 40 and a cooperating lock ring 41 carried on the low end thereof and cooperating with the top of the base 32 adjacent to the opening 38. The ring 39, in turn, carries a depending tubular heat shield 42 of general skirt-like structure that is spaced inwardly with respect to the cooperating heat shield 29, the extreme lower end of the heat shield 42 being outwardly flared, as indicated at 43, so that it covers the top of the base 32. A center cavity 44 is formed in the top of the ring 39 and carries a sensing button 45 formed of aluminum, or the like.

In the arrangement, the heat shields 29 and 42, as well as the tubular member 37 are preferably formed of stainless steel or other bright and reflective material; while the sensing button 45 is formed of aluminum, or the like, as previously noted, so that it constitutes a good heat conductor capable of following closely the temperature of the bottom wall of a cooking vessel, or the like, supported by the heating element L. The tubular member 37, the ring 39, the heat shield 42 and the sensing button 45 are movable as a unit with respect to the base 32, by virtue of an arrangement of the coil spring 46 surrounding the tubular member 37 and disposed between the top of the base 32 and the bottom of the ring 39. More particularly, the coil spring 46 normally biases the parts 37, 39, 42 and 45 upwardly with respect to the base 32; whereby the top surface of the sensing button 45 is normally disposed slightly above the substantially horizontal plane of the flattened top surface of the heating element L. However, when a cooking vessel, or the like, is placed upon the heating element L, the bottom wall thereof engages the top surface of the sensing button 45 moving the elements 37, 39, 42 and 45 downwardly with respect to the base 32 against the bias of the coil spring 46; whereby the top surface of the sensing button 45 is urged into good thermal contact with the bottom wall of the supported cooking vessel by the coil spring 46.

A temperature sensing resistor RT is arranged in a cooperating centrally disposed cavity formed in the lower surface of the supporting button 45. The temperature sensing resistor RT is, of course, movable with the sensing button 45 and is arranged in good heat exchange relation therewith, for a purpose more fully explained hereinafter, the temperature sensing resistor RT being included in an external electric circuit, described more fully hereinafter, the connecting wire elements extending through the tubular elements 37 and through a hole 33a provided in the housing 33. Since the wiring mentioned is subject to rather a high temperature, it is preferably formed of silver, or the like, and is preferably covered with an insulating material capable of withstanding the relatively high temperature mentioned, such, for example, as polytetrafluoroethylene, sold as "Teflon." The sensing resistor RT is formed of material having a high positive temperature coefficient of resistance, such, for example, as the ceramic-like material consisting of sintered aluminum oxide, and an oxide of magnesium, manganese, titanium, iron, nickel, cobalt, zinc, etc., and known as "Thermistor" material. For example, the resistor RT may have the exceedingly high temperature coefficient of resistance corresponding to a resistance change of about 10 ohms/° C.; whereby the temperature characteristic of the thermistor RT may be as follows:

| Temperature (° C.): | Total resistance (ohms) |
|---|---|
| 25° | 200 |
| 50° | 400 |
| 100° | 1,000 |
| 150° | 1,500 |
| 200° | 2,000 |

Figure 3:
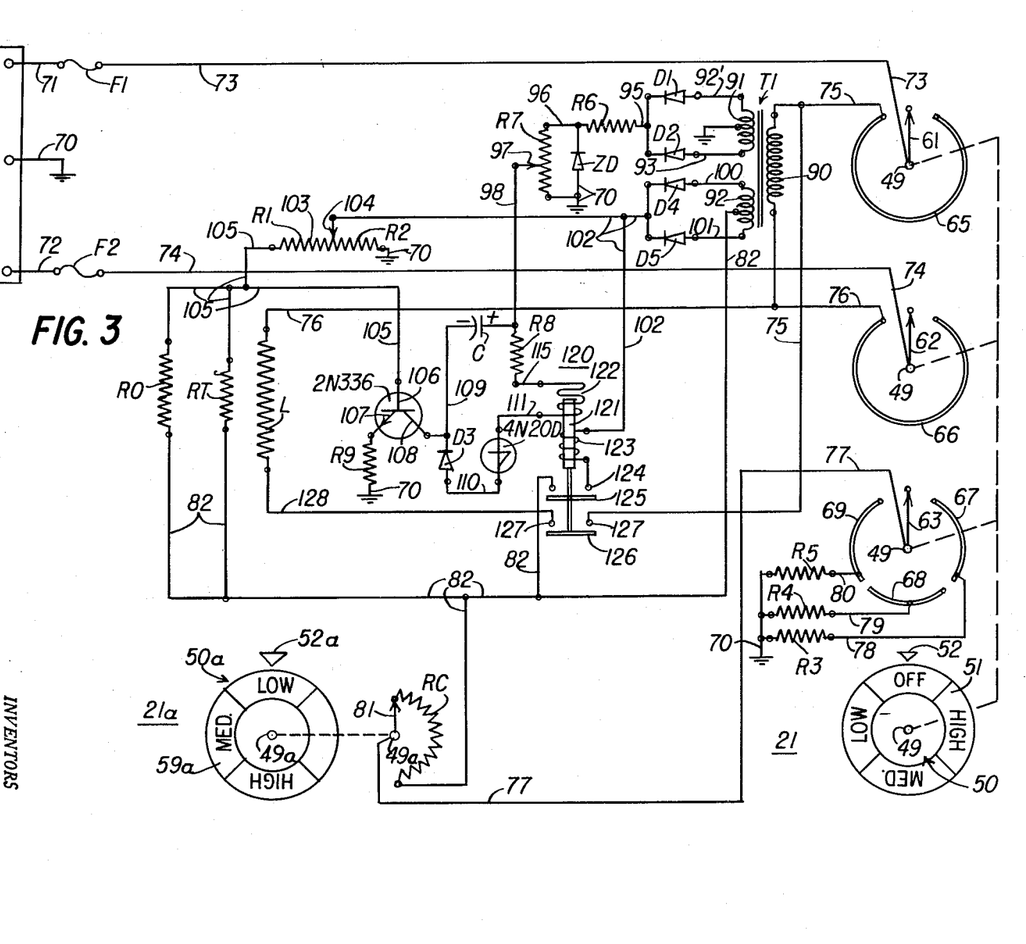
FIG. 3 is a diagram of the electric control circuit for the electric heating unit or hotplate and incorporating the temperature sensing unit shown in FIG. 2 and the improved electric control circuit of the present invention.

Referring now to FIG. 3, the manually operable control switch 21 carried by the backsplash 17 and individually associated with the hotplate 16 comprises a rotatably mounted operating shaft 49 carrying a manual dial or knob 50 on the outer end thereof and provided with indicia 51 cooperating with an index marker 52 carried by the backsplash 17. More particularly, the control switch 21 comprises off, low, medium and high positions that correspond to respective portions of the indicia 51 carried by the manual dial 50 and cooperating with the index marker 52. In the arrangement, the indicia 51 carried by the manual dial 50 correspond to temperatures of the cooking vessel supported by the hotplate 16; whereby the low range may correspond to the temperature range 120°–220° F.; the medium range may correspond to the temperature range 220°–320° F.; and the high range may correspond to the temperature range 320°–420° F. Further, the rotatable shaft 49 of the control switch 21 carries four wipers 61, 62 and 63 that are simultaneously adjusted as the manual knob 50 is rotated. The wipers 61 and 62, respectively, comprise portions of switches respectively including cooperating conducting segments 65 and 66; and the wiper 63 comprises a portion of a switch including three cooperating conducting segments 67, 68 and 69 which are connected to resistors R3, R4, and R5, respectively, which comprise a portion of a resistance bridge, the other terminals of the resistors R3, R4 and R5 all being connected to ground through a conductor 70.

Also the circuit network comprises a three-wire Edison source of power supply of 236 volts, single-phase, A.C. including two outside lines 71 and 72 and a grounded neutral line 70, the outside lines 71 and 72 being respectively connected through fuses F1 and F2 to lines 73 and 74 connected to the wipers 61 and 62. The conducting segments 65 and 66 respectively terminate two conductors 75 and 76; the wiper 63 terminates a conductor 77; and the conducting segments 67, 68 and 69 are connected to the resistors R3, R4 and R5 respectively by conductors 78, 79 and 80. In the arrangement, when the manual dial 50 occupies its off position, the wipers 61, 62 and 63 respectively disengage the cooperating conducting segments 65, 66, 67, 68 and 69. When the manual dial 50 is rotated in the clockwise direction out of its off position about 10° the wipers 61 and 62 respectively engage the conducting segments 65 and 66 and the wiper 63 engages the conducting segment 67 to connect the resistor R3 between the conductors 70 and 77. As the manual dial 50 is rotated further in the clockwise direction from the low range to its medium range, the wipers 61 and 62 remain in engagement with the respective conducting segments 65 and 66 and the wiper 63 moves out of engagement with the conducting segment 67 and into engagement with the conducting segment 68 whereby to place the resistor R4 between the conductors 70 and 77. When the manual dial 50 is rotated further in the clockwise direction into its high range, the wipers 61 and 62 remain in engagement with the respective conducting segments 65 and 66, and the wiper 63 moves from the conducting segment 68 to the conducting segment 69 whereby to place the resistor R5 in circuit between the conductors 70 and 77.

The second manually operable control switch 21a carried by the backsplash 17 and associated with the hotplate 16 comprises a rotatably mounted operating shaft 49a carrying a manual dial or knob 50a on the outer end thereof and provided with indicia 51a cooperating with an index marker 52a carried by the backsplash 17. More particularly, the control switch 21a comprises low, medium and high positions which correspond to respective portions of the indicia 51a carried by the manual dial 50a and cooperating with the index marker 52a. In the arrangement, the indicia 51a carried by the manual dial 50a correspond to temperatures of the cooking vessel supported by the hotplate 16 within each of the principal ranges of the first manually operable control switch 21, whereby the particular temperature desired within the low range setting of the manual dial 50 can be obtained by the adjustment of the manual dial 50a, and, correspondingly, the particular temperature within the medium range and the high range as selected by the manual dial 50 can be adjusted by means of the manual dial 50a. Further, the rotatable shaft 49a of the control switch 21a carries a wiper 81 that is adjusted as the manual knob 50a is rotated. The wiper 81 comprises a portion of a resistance bridge including a control resistor RC. One terminal of the resistor RC is open and the other is connected to a conductor 82 which is connected to the center tap of one of the secondary windings of the transformer T1 as will be explained more fully hereinafter.

The circuit network further comprises a main power supply transformer T1 having the usual primary winding 90 and two secondary windings 91 and 92, the primary winding 90 being connected between the conductors 75 and 76 to which the full line voltage is supplied by means of the wipers 61 and 62 contacting the conducting segments 65 and 66. The first secondary winding 91 has a center tap connection which is grounded through the conductor 70 and each of the end terminals of the secondary winding 91 are connected respectively to like poles of silicon rectifiers D1 and D2 by means of conductors 92' and 93 respectively, the other like poles of the rectifiers D1 and D2 being connected by a conductor 95 to one terminal of a limiting resistor R6. In a typical operating example, the A.C. input voltage to the primary winding 90 may be 230 volts and the secondary voltage developed across the secondary winding 91 is 60 volts R.M.S. which when applied to the silicon rectifiers D1 and D2 provides a full wave rectified output therefrom. The other terminal of the resistor R6 is connected by a conductor 96 to one terminal of a resistor R7 and to one terminal of a Zener diode ZD which is characterized by a conduction when a voltage of a specified magnitude is applied btween the terminals thereof, the diode ZD being of the type which becomes highly conductive when a potential of 28 volts is applied between the terminals thereof. The other terminal of the Zener diode ZD is connected through the conductor 70 to ground, whereby the output from the silicon rectifiers D1 and D2 is applied across a voltage divider including the resistors R6 and R7 connected in series to ground, the resistor R7 being shunted by the Zener diode ZD to clip or limit the voltage peaks of the pulsating D.C. voltage thereacross at 28 volts. The resistor R7 is provided with a wiper 97 which is connected to a conductor 98 whereby a portion of the potential developed across the resistor R7 can be applied through the conductor 98 to a charging circuit in a manner and for a purpose which will be described more fully hereinafter.

The second secondary winding 92 of the transformer T1 has the center tap thereof connected to the conductor 82 and the outer terminals thereof are connected respectively by the conductors 100 and 101 to like terminals of silicon diode rectifiers D4 and D5 which have the other like terminals thereof connected by a conductor 102. The secondary winding 93 and the rectifiers D4 and D5 are arranged to provide a full-wave rectifier having as an output therefrom a pulsating D.C. voltage of 20 volts between the conductors 82 and 102. The conductor 82 is further connected to one terminal of the resistor RC, to one terminal of the thermistor RT, and to one terminal of an overload protector resistor RO having a resistance of 10 megohms. The other terminals of the thermistor RT and the resistor RO are connected together by a conductor 105 which is also connected to one terminal of a resistor 103 that is composed of two resistor sections R1 and R2, a movable contact 104 being provided to contact the resistor 103 at the junction of the resistor sections R1 and R2. The other terminal of the resistor 103 is connected to ground by means of the conductor 70 and the movable contact 104 is connected to the conductor 102 which is connected to the other terminals of the rectifiers D4 and D5.

The circuit network in addition includes a silicon transistor 2N336 which provides amplification for the control signal in the network and includes the usual base terminal 106, an emitter 107 and a collector 108, the base terminal 106 being connected to the conductor 105, the emitter 107 being connected to one terminal of a resistor R9 having the other terminal thereof grounded through the conductor 70, and the collector 108 being connected to a conductor 109. The conductor 109 is connected to one terminal of a charging capacitor C and the other terminal of the capacitor C is connected to the conductor 98. The conductor 109 is further connected to one input terminal of a blocking silicon diode D3 which has the other input terminal thereof connected by a conductor 110 to one of the input terminals of a Shockley diode 4N20D, the Shockley diode 4N20D being a four layer solid state device including junctions arranged in the order p-n-p-n and characterized by having a high impedance of the order of one million ohms to the passage of current therethrough until a potential of a predetermined value is impressed thereacross and having an impedance of one ohm to the passage of current therethrough upon the application of a potential of the predetermined value and of the proper polarity to the input terminals thereof, the diode 4N20D requiring a potential of 20 volts thereacross to cause heavy conduction therethrough, this being called the "avalanche" voltage thereof. The other input terminal of the Shockley diode 4N20D is connected by a conductor 111 to one of the input terminals of an electromagnetic actuator or relay 120 having a pick-up coil 122, a holding coil 123, a movable armature 122, a pair of holding contacts 124—125 and power contacts 126—127. The conductor 111 is more particularly connected to one of the terminals of the pick-up coil 122, the other terminal thereof being connected by a terminal 115 to one terminal of the resistor R8, the other terminal of the resistor R8 being connected to the conductor 98. One of the input terminals for the holding coil 123 is connected to the conductor 102 and the other terminal of the holding coil 123 is connected to the contact 124. The contact 125 is mounted upon the movable armature 121 and is movable into and out of engagement with the contact 124 upon movement of the armature 121 outwardly and downwardly, electrical connection being made to the contact 125 by the conductor 82. The power contact 126 is likewise mechanically connected to the armature 121 for movement therewith into and out of engagement with the contacts 127, one of the contacts 127 being connected to the main supply conductor 75 and the other contact 127 being connected to the conductor 128 which in turn connects with one terminal of the heating element L, whereby closure of the contacts 126—127 places the heating element L across the main supply conductors 75 and 76 to cause heating thereof.

Figure 4:
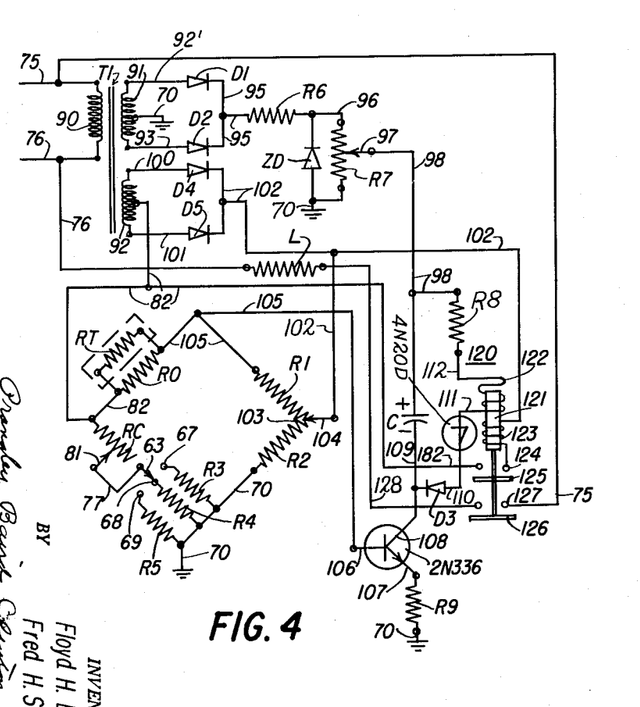
FIG. 4 is a simplified schematic diagram of the electric control circuit illustrated in FIG. 3.

Referring particularly to FIG. 4 of the drawings wherein there is shown a simplified and rearranged schematic drawing of the parts illustrated in FIGS. 1 to 3, the operation of the control network and the associated parts will be described in detail. It will be seen from FIG. 4 that the resistors R1, R2, R3, R4, R5, RC, RO and RT form a Wheatstone network in which one leg of the bridge network comprises that portion of the control resistor RC between the wiper 81 and the conductor 82 in series with the selected one of the range resistors R3, R4 and R5; the second leg of the bridge network comprises the temperature sensing resistor RT in parallel with the overload protection resistor RO and connected between the conductors 82 and 105; the third leg of the bridge network comprises that portion of the resistor 103 disposed between the movable contact 104 and the conductor 105 and designated R1; and the fourth leg of the bridge network comprises that portion of the resistor 103 disposed between the movable contact 104 and the conductor 70 and designated R2. The power to operate the bridge network is derived from the full-wave rectifier including the diodes D4 and D5, the input to the bridge network being provided by the conductor 82 connected to the junction of the resistors RC and RT and the conductor 102 connected to the movable contact 104 at the junction of the resistors R1 and R2, the voltage applied to the bridge being a pulsating D.C. voltage. The common junction of the resistors R2, R3, R4, and R5 is grounded and the output from the bridge network appears between the conductors 70 and 105, this output being applied to the silicon transistor 2N336 for amplification.

Now assuming that the cook wishes to carry out a medium temperature cooking operation upon the hotplate 16 and that the heating element L thereof is cool, the cook places the cooking vessel and its contents in a supporting position on the top surface of the heating element L, whereby the bottom wall of the cooking vessel engages the sensing button 45 and moves the sensing unit 27 into its depressed position so that the sensing button 45 is in good thermal contact with the bottom of the cooking vessel. At this time, the thermistor RT is cool so that it has the exceedingly low resistance previously noted. Finally, the cook rotates the manual dial 50 in the clockwise direction from its off position to its medium position whereby the wipers 61 and 62 engage the conducting segments 65 and 66, respectively, so as to complete a circuit for operating the various rectifiers D1, D2, D4 and D5 and to effect operation of the control bridge network, the amplifier 2N336, and the charging capacitor C; the cook likewise will adjust the manual dial 50a to determine the particular temperature within the medium range at which the hotplate 16 is to operate. The output of the rectifiers D4 and D5 is applied to a circuit that can be traced from the conductor 82 through two parallel paths to the conductor 102, one of the parallel paths being through the resistors RO and RT in parallel with each other and in series with the resistor R1, the other parallel path being through the resistors RC and R4 in series with each other and with the resistor R2. The resistance values of the various resistors in the bridge network are chosen so that there is no output between the conductors 70 and 105 when the temperature of the thermistor RT is that set by the resistor RC and the selected one of the resistors R3, R4 or R5. At the beginning of the cooking operation when the hotplate 16 is cold, the resistance of the thermistor RT will be substantially less than that required for balance of the bridge and, accordingly, there will be a difference potential generated between the conductors 70 and 105. The greater the difference between the temperature of the thermistor RT and the temperature selected by the cook and determined by the resistors R4 and RC, the greater will be the signal appearing between the conductor 70 and 105; and conversely, the more nearly the temperature of the resistor RT approaches the temperature selected by the cook, the smaller will be the output signal between the conductors 70 and 105 and eventually no output signal will be derived when the temperature of the resistor RT is that set by the cook by the operation of the dials 50 and 50a. The character of the output signal from the bridge appearing between the conductors 70 and 105 can be seen by reference to FIG. 5 of the drawings wherein FIG. 5A illustrated the A.C. input voltage appearing on the conductors 75—76, FIG. 5B illustrates the pulsating D.C. input to the bridge network appearing between the conductors 82 and 102, and FIG. 5C illustrates the output from the bridge network on the conductor 105 when there is an unbalance in the bridge, i.e., the temperature of the thermistor RT is below that set by the cook using the dials 50 and 50a.

The output signal from the bridge network appearing between the conductors 70 and 105 is applied to the input transistor 2N336 which is a part of the charging circuit for the capacitor C. More particularly, the charging circuit for the capacitor C can be traced from ground through the conductor 70, to limiting and biasing resistor R9, to the transistor 2N336, to the capacitor C, to the conductor 98, and to the movable contact 97 against the resistor R7; the potential appearing between the movable contact 97 and the grounded conductor 70 is the potential applied to operate the charging circuit for the capacitor C. The potential between the contact 97 and the conductor 70 in turn is derived from the full-wave rectifier including the diodes D1 and D2, the output therefrom being a full-wave rectified signal in the form of a pulsating D.C. voltage of the same character illustrated in FIG. 5B; that pulsating voltage is applied across a voltage divider network including the resistors R6 and R7 to ground, the resistor R7 being shunted by the Zener diode ZD which conducts when the potential of the pulses across the resistor R7 reaches a predetermined value, for example, 28 volts, whereby to clip or limit the voltage appearing across the resistor R7; consequently, the potential between the movable contact 97 and the conductor 70 appearing on the conductor 98 is a clipped full-wave rectified voltage of the type illustrated in FIG. 5E of the drawings. When the bridge is out of balance so that a signal appears at the input to the transistor 2N336, the transistor constitutes a low impedance in the charging path of the capacitor C and consequently the capacitor C charges rapidly toward the potential appearing on the conductor 98. There is no charging current through the circuit in parallel with the charging capacitor C, namely, the circuit including the blocking diode D3, the Shockley diode 4N20D, the pick-up coil 122 of the relay 120, and the limiting resistor R8, because of the presence of the blocking diode D3 which is poled to prevent conduction in a direction that would charge the capacitor C; furthermore, the Shockley diode 4N20D will not conduct in the direction of conduction of the diode D3 until the potential across the capacitor C reaches a predetermined value of 20 volts. Eventually, the charge on the capacitor C reaches 20 volts at which time the impedance of the Shockley diode 4N20D changes from one million ohms to one ohm and permits rapid discharge of the capacitor C through the discharge circuit including the limiting resistor R8, the pick-up coil 122 of the relay 120, the Shockley diode 4N20D, and the blocking diode D3.

Figure 5:
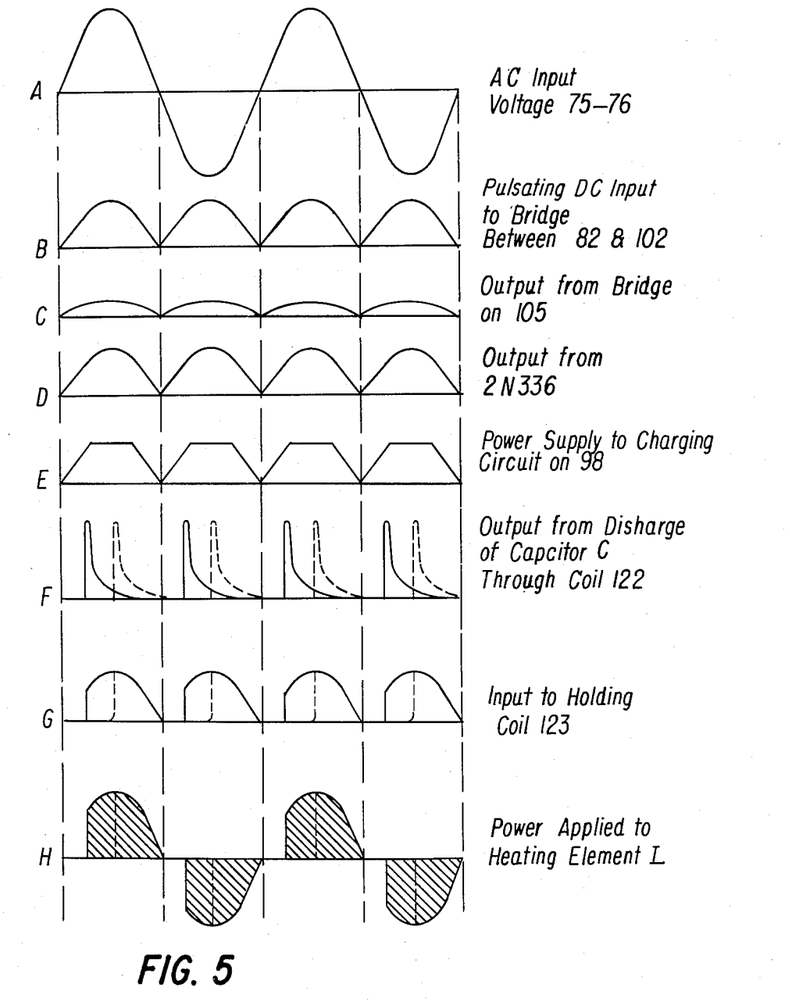
FIG. 5 is a schematic diagram of the voltages obtained at different points in the circuit of FIGS. 3 and 4 during the operation thereof and illustrating particularly the phase relationship among the voltages.

The surge of current through the pick-up coil 122 of the relay 120 upon conduction of the Shockley diode 4N20D produces a wave form of the general character illustrated in solid lines in FIG. 5F of the drawings, the pulse illustrated therein being sufficient to operate the relay from the restored position thereof to the operated position thereof thereby to close the contacts 124—125 and the contacts 126—127. Closure of the contacts 126—127 immediately applies the full line potential across the heating element L from a circuit that can be traced from the main supply conductor 75 through the contacts 126—127 to the conductor 128, through the heating element L and to the other main supply conductor 76. It will be appreciated by reference to FIG. 5F of the drawings that the potential derived from the discharge of the capacitor C will not be sufficient to maintain the relay 120 in its actuated condition during the remainder of the power half cycle and it is for this reason that the holding coil 123 and the holding contacts 124—125 have been provided, closure of the contacts 124—125 upon discharge of the capacitor C to the Shockley diode 4N20D applying a potential of the character illustrated in FIG. 5G of the drawings across the holding coil 123. More specifically the potential applied to the holding coil 123 is the full-wave rectified pulsating D.C. potential derived from the diodes D4—D5 and the potential thereof is sufficient to hold the relay 120 in the actuated position until the A.C. input voltage (see FIG. 5A) returns to zero at which time there will be no potential applied to either the pick-up coil 122 or the holding coil 123 to maintain the relay 120 in the actuated position thereof and, accordingly, the relay 120 will fall out and thereby open the contacts 126 and 127 when the potential applied to the circuit including those contacts is at a minimum or substantially zero potential. The power delivered to the heating element L by closure of the contacts 126—127 upon operation of the relay 120 will therefore be that illustrated by the full shaded area in FIG. 5H of the drawings. Accordingly, a portion of each half cycle of input voltage is applied to the heating element L, substantially all of each half cycle of the input voltage being applied thereto by operation of the relay 120 when the bridge network is greatly out of balance as is the case when beginning the cooking operation with the hotplate 16 cool, the voltage wave form that is applied under these conditions being substantially that illustrated in FIG. 5H of the drawings, power being applied to the heating element L during the beginning of each half cycle of the input voltage as determined by the points of firing of the Shockley diode 4N20D and being applied throughout the rest of the half cycle with the relay 120 dropping out each time when the input voltage is substantially zero or is passing through zero thereby minimizing arcing at the power contacts 126—127.

If the heating element L continues to be fed with the power pulses at the rate of 120 per second as illustrated in FIG. 5H of the drawings, the hotplate 16 will become heated thereby to heat the cooking vessel and to heat the sensing button 45 thereby heating the thermistor RT. As the resistor RT increases in temperature, the resistance thereof increases whereby to place the bridge network more nearly in balance and thus reducing the output signal between the conductors 70 and 105 which is fed as the input to the amplifier transistor 2N336. A reduced signal fed to the transistor 2N336 will increase the impedance thereof and cause the capacitor C to charge at a slower rate and, accordingly, the breakdown or avalanche voltage of 20 volts needed to fire the Shockley diode 4N20D will be reached later, thereby delaying the pulses fed to the pick-up coil 122 of the relay 120, the pulses, for example, being those illustrated by dashed lines in FIG. 5F of the drawings. Consequently the power contacts 126—127 will be closed later during the corresponding power half cycle and a smaller portion of the input voltage power half cycles will be applied, that portion to the right of the vertical dashed lines in FIG. 5H being applied to the heating element L, thereby decreasing the heating produced by the heating element L. When the temperature of the cooking vessel reaches that selected by the cook by means of the dials 50 and 50a, the sensing button 45 will be heated to that temperature and in turn will heat the thermistor RT to a temperature such that the resistance thereof causes a balance in the bridge network whereby no output signal is derived between the conductors 70 and 105. As a consequence, the impedance of the transistor 2N336 will be so great that the charging capacitor C will never charge to the avalanche voltage for the Shockley diode 4N20D and therefore no pulses will feed to the pick-up coil 122 of the relay 120 and no heating power is applied to the heating element L.

Subsequently, the temperature of the cooking vessel and its contents subsides when no heat is being supplied by the heating element L so that the temperature of the resistor RT is reduced bringing about a decrease in the resistance thereof with a subsequent increase in the output from the bridge network on the conductor 105 applied to the amplifier transistor 2N336, this resulting in a reduction of the effective impedance thereof and therefore an increase in the charging rate of the charging capacitor C. The capacitor C will then charge fast enough to fire the Shockley diode 4N20D prior to the end of the input voltage cycles so that a small amount of power will again be applied to the heating element L by the opening and closing of the power contacts 126—127 until the temperature of the cooking vessel is again raised to that selected.

From the above explanation it will be seen that the charging rate of the charging capacitor C is proportional to the unbalance of the bridge network which is in turn a function of the difference between the temperature of the resistor RT as determined by the temperature of the cooking vessel on the hotplate 16 and the temperature selected by the cook by adjustment of the dials 50 and 50a which adjust the resistors R3, R4, R5 and RC. The time at which the Shockley diode 4N20D fires to provide input pulses to the pick-up coil of the electromagnetic actuator or relay 120 is in turn a function of the charging rate of the charging capacitor C and therefore is a function of the temperature difference between the thermistor RT and the temperature selected by the cook. A large temperature difference results in a large input to the amplifier transistor 2N336 and provides a fast charging time for the capacitor C thus causing early conduction of the Shockley diode 4N20D thereby to produce the pickup pulses illustrated by solid lines in FIG. 5F early in the phase of each half cycle of the input voltage illustrated in FIG. 5A. As the temperature of the resistor RT approaches the temperature selected by the cook, the unbalance signal amplified by the transistor 2N336 becomes smaller, the charging time of the capacitor C becomes longer, and the Shockley diode 4N20D fires later in the cycles of the A.C. voltage (for example, the pulses illustrated by dashed lines in FIG. 5F) thereby to apply a lesser portion of the input voltage across the heating element L. When the temperature RT reaches that selected by the cook, there is no output from the bridge network and the capacitor C does not charge to a voltage which will fire the Shockley diode 4N20D and there will be no signal applied to the pick-up coil 122 of the relay 120 and no portion of the input voltage will be applied to the heating element L. The control system therefore upon demand as determined by the bridge network, applies a portion of each half cycle of the input voltage across the heating element L, the portion of each half cycle applied to the heating element L varying from all of the half cycle to none thereof, the amount applied being proportional to the temperature difference between the thermistor RT and the temperature set by the cook by means of the dials 50 and 50a. As a result, there is a very smooth and continuous application of power, when demanded, in the form of 120 pulses per second to the heating element L, the amount of power applied being proportional to the power needed; as a consequence there is no overrun of the selected temperature or overheating of the heating element L and the control of the power fed to the heating element L is continuously variable and accurate whereby to provide a precise control of the temperature of the cooking vessel.

It is important to note from the above description that the relay 120, when power is demanded by the condition of the bridge network, follows each half cycle of the input A.C. voltage whereby to operate 120 times per second when the input voltage is taken from a 60 cycle source. It is absolutely necessary in order to preserve the life of the contacts 126—127 that those contacts be opened when little or substantially no current is flowing therethrough and no potential is applied thereacross or to the associated circuits. By the use of the combination of the pick-up coil 122 and the holding coil 123 this can be readily accomplished if the relay 120 has a recovery time of or can be restored within approximately two milliseconds after the removal of the voltage wave forms of FIGS. 5F and 5G therefrom. In view of the very short duration of the pulses illustrated in FIG. 5F that are derived by discharging the capacitor C, it is necessary to provide the holding coil 123 in order to insure that the relay stays up with the contacts 126—127 closed during the remaining portion of each half cycle; conversely the narrow width of the pulses fed to the pick-up coil 122 insures that if the pulses of FIG. 5F are fed at or near the end of a half cycle that there will be substantially no current through the pick-up coil 122 and the holding coil 123 as the power cycle passes through zero potential. By virtue of the above method of operation and construction, the relay 120 can operate 120 times per second when power is demanded for the heating element L without unusual wear or injury to the power contacts 126—127 since these contacts are always opened when substantially no potential is applied thereacross.

In view of the above it will be understood that the carrying out of the cooking operations in the high range and the low range upon the hotplate 16 is substantially identical to that described in connected with the medium range cooking operation except that the manual dial 50 is rotated to the positions corresponding to the high range and the low range thereof, whereby correspondingly higher and lower temperatures are set for the operation of the control network. In connection with the operation of the manual dial 50 into its high range, it is noted that the wiper 63 engages the associated conducting segment 69 so as to place the resistor R5 in series with the control resistor RC. Similarly in connection with the operation of the manual dial 50 into its low range, it is noted that the wiper 63 engages the conducting segment 67 so as to place the resistor R3 in series with the resistor RC.

Of course, it will be understood that at the conclusion of any cooking operation, when the manual dial 50 is returned back into its off position, the wipers 61 and 62, respectively, disengage the associated conducting segments 65 and 66 effecting deenergization of all of the circuit elements so that the heating element L is disconnected from the three-wire Edison source.

In the operation of the circuit network, it will be appreciated that the resistor RO serves as a fail safe protective device in the event that the thermistor RT becomes disconnected or broken. The resistance of the resistor RO is sufficiently high to provide an output from the network sufficient substantially to cut off the transistor 2N336 and thus to prevent the application of any power to the heating element L. The movable contact 104 on the resistor 103 permits a factory adjustment of the bridge network to insure that the bridge is balanced when the temperature of the thermistor RT is that corresponding to the setting of the resistors R3, R4, R5 and RC. The movable contact 97 associated with the resistor R7 permits the selection by a factory adjustment of the proper operating voltage for the charging network associated with the charging capacitor C. The resistor R8 in the discharge circuit for the capacitor C is a limiting resistor to insure that the current flowing through the discharge circuit is not sufficiently great to injure any of the components therein and particularly the Shockley diode 4N20D. The resistor R9 provides a bias for the transistor 2N336 of approximately 0.4 volt.

Figure 6:
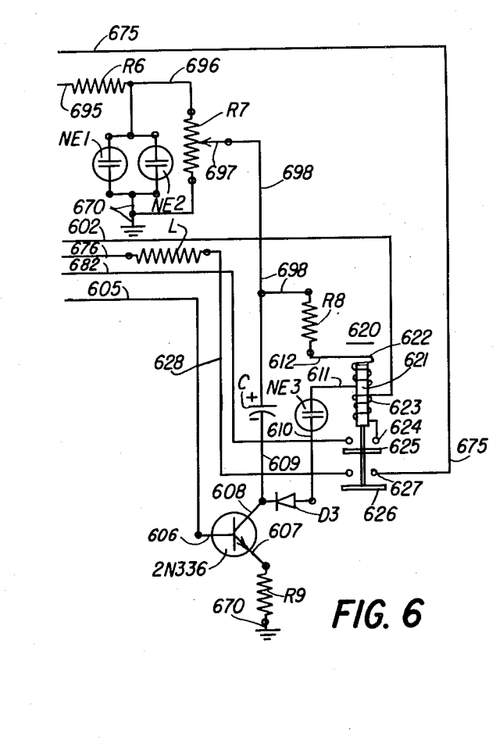
FIG. 6 is a circuit diagram similar to FIG. 4 and illustrating a second embodiment of the control circuit of the present invention wherein gaseous discharge tubes have been substituted for certain of the solid state devices utilized in the circuit of FIG. 4.

There is shown in FIG. 6 of the drawings, a second preferred embodiment of the control circuit illustrated in FIG. 4, like designations having been given to like circuit elements and similar numerals having been applied to like elements; for example, the main input voltage supply lines being numbered 675 and 676 in FIG. 6 and corresponding to the conductors 75 and 76 in FIGS. 3 and 4. The output from the rectifiers D1 and D2 appears on the conductor 695 and is applied to ground through the resistors R6 and R7. Two neon bulbs NE1 and NE2 have been provided in parallel circuit with each other shunting the resistor R7 to ground to provide a clipped full-wave pulsating D.C. voltage thereacross of the type illustrated in FIG. 5E of the drawings. A portion of the voltage developed across the resistor R7 is taken therefrom by means of movable contact 697 being used as the charging potential for a charging circuit including the resistor R9, the transistor 2N336, and the charging capacitor C, the output, if any, of the bridge network being applied to the base of the transistor 2N336 to vary the impedance thereof in the charging circuit of the capacitor C. The discharge circuit for the capacitor C is through the resistor R8, the pick-up coil 622 of an electromagnetic actuator or relay 620, a neon bulb NE3, and a silicon rectifier blocking diode D3 which is poled to permit passage of current only in the discharge direction for the capacitor C. Energization of the pick-up coil 622 of the relay 620 operates two sets of contacts, a first set of contacts 624 and 625 for a holding coil 623 which is connected across the pulsating D.C. output appearing between the conductors 602 and 682 and having the output of the rectifiers D4—D5 therebetween, and a second set of contacts 626 and 627 which establish a circuit through the heating element L that can be traced from the main supply conductor 675 to the contacts 626—627, through the conductor 628 to one terminal of the heating element L, and from the other terminal of the heating element L to the main supply conductor 676. By this arrangement the relay 620 upon closure of the power contacts 626—627 thereof supplies a portion of the corresponding half cycle as the power input to the heating element L, the relay 620 falling out and the power contacts 626—627 opening as the input voltage passes through the zero potential value thereof.

The control circuit of FIG. 6 operates in substantially the same manner as the control circuit of FIGS. 3 and 4, the neon bulbs NE1 and NE2 providing a fixed maximum amplitude pulsating D.C. voltage to the charging circuit for the charging capacitor C, the neon bulbs NE1 and NE2 therefore acting in a manner analogous to that of the Zener diode ZD of FIGS. 3 and 4, and the neon bulb NE3 providing an output pulse from the discharge circuit to the pick-up coil 622 of the relay 620 when the capacitor C has charged to a predetermined potential, the neon bulb NE3 therefore acting in a manner analagous to that of the Shockley diode 4N20D described above with respect to FIG. 4. The control network of FIG. 6 therefore in combination with the relay 620 serves to provide 120 power pulses per second to the heating element L so long as there is any demand for heat therefrom as determined by the thermistor RT in thermal contact with the cooking vessel being heated. The power delivered in each power pulse is proportional to the demand, the pick-up of the relay 620 being time phase controlled, whereby the power contacts 626—627 are closed early in the power cycle when there is a large demand for heat, close progressively later in the power cycle as the demand for heat decreases and eventually do not close at all if there is no demand for heat from the heating element L. The relay 620 drops out at the end of each half cycle when the applied potential on the conductors 675—676 passes through zero value thereof and the relay 620 will not pick up again to close the contacts 626—627 until an actuating pulse is provided to the pick-up coil 622 thereof by conduction through the neon bulb NE3 during discharge of the capacitor C. The time phase control is provided by the variable charging time of the capacitor C which is regulated in turn by the unbalance signal from the bridge network amplified through the transistor 2N336. The circuit of FIG. 6 will also provide even and accurate control of the heat produced by the heating element L, the heat produced being proportional to the demand and infinitely variable from full heating to zero heating.

Accordingly, it is apparent that there has been provided in a heating apparatus of the hotplate type improved circuit networks for selectively establishing within a relatively wide temperature range the cooking temperature of a cooking vessel supported by the hotplate and for selectively controlling the electric power supplied to the hotplate in accordance with the desired cooking temperature thus established so as to maintain the desired cooking temperature of the cooking vessel and its contents during the cooking operation.

While there has been described what is at present considered to be certain preferred embodiments of the invention, it will be understood that various modifications may be made therein, and it is intended to cover in the appended claims all such modifications that fall within the true spirit and scope of the invention.

What is claimed is:

1. In an electric heating system including an electric heater, a temperature sensing unit arranged to sense the temperature of a medium heated by said heater, a manually operable controller selectively operative to set different desired temperatures of the medium heated by said heater, and a source of alternating electric power having a frequency $f1$; the combination comprising a power switch operative between an open position disconnecting said heater from said source and a closed position connecting said heater to said source, an electromagnetic actuator including a winding and having a restored position actuating said power switch into its open position and an operated position actuating said power switch into its closed position and having a restoration time that is a small proportion of a cycle of the frequency $f1$, a control circuit operated from said power source and jointly governed by said temperature sensing unit and said controller and operative to produce control signals in response to a difference between the temperature sensed by said temperature sensing unit and the temperature setting of said controller and occurring at a frequency of $f2$ and persisting until the potential of said power source is substantially zero and terminating therewith, wherein $f2=Nf1$ and $N=1$ or 2, and means for impressing the control signals produced by said control circuit upon the winding of said actuator in order to govern the movements of said actuator between its restored and operated positions at the frequency $f2$ and so that said actuator is returned to its restored position when the potential of said power source is substantially zero, whereby said power switch is operated substantially synchronously with said actuator and is thus returned into its open position when the potential of said power source is substantially zero so as to minimize arcing therein.

2. In an electric heating system including an electric heater, a temperature sensing unit arranged to sense the temperature of a medium heated by said heater, a manually operable controller selectively operative to set different desired temperatures of the medium heated by said heater, and a source of alternating electric power having a frequency $f1$; the combination comprising a power switch operative between an open position disconnecting said heater from said source and a closed position connecting said heater to said source, an electromagnetic actuator including a winding and having a restored position actuating said power switch into its open position and an operated position actuating said power switch into its closed position and having a restoration time that is a small proportion of a cycle of the frequency $f1$, a first control circuit operated from said power source and jointly governed by said temperature sensing unit and said controller and operative to produce first control signals in response to a difference between the temperature sensed by said temperature sensing unit and the temperature setting of said controller and occurring at a frequency of $f2$ and having a duration that is a small proportion of a cycle of the frequency $f1$, wherein $f2=Nf1$ and $N=1$ or 2, means for impressing the first control signals produced by said first control circuit upon the winding of said actuator in order to move said actuator to its operated position, a second control circuit operated from said power source and operative to produce second control signals in phase with the source of alternating electric power and occurring at a frequency of $f2$ and persisting until the potential of said power source is substantially zero and terminating therewith, and means for impressing the second control signals produced by said second control circuit upon the winding of said actuator in order to hold said actuator in the operated position thereof subsequent to the application of said first control signals thereto and to permit movement of said actuator to its restored position when the potential of said power source is substantially zero, whereby said power switch is operated substantially synchronously with said actuator and is thus returned into its open position when the potential of said power source is substantially zero so as to minimize arcing therein.

3. In an electric heating system including an electric heater, a temperature sensing unit arranged to sense the temperature of a medium heated by said heater, a manually operable controller selectively operative to set different desired temperatures of the medium heated by said heater, and a source of alternating electric power having a frequency $f1$; the combination comprising a power switch operative between an open position disconnecting said heater from said source and a closed position connecting said heater to said source, an electromagnetic actuator including a pick-up winding and a holding winding and having a restored position actuating said power switch into its open position and an operated position actuating said power switch into its closed position and having a restoration time that is a small proportion of a cycle of the frequency $f1$, a first control circuit operated from said power source and jointly governed by said temperature sensing unit and said controller and operative to produce first control signals in response to a difference between the temperature sensed by said temperature sensing unit and the temperature setting of said controller and occurring at a frequency of $f2$ and having a duration that is a small proportion of a cycle of the frequency $f1$, wherein $f2=Nf1$ and $N=1$ or 2, means for impressing the first control signals produced by said first control circuit upon the pick-up winding of said actuator in order to govern the movements of said actuator from its restored to its operated position at the frequency $f2$, a second control circuit operated from said power source and operative to produce second control signals in phase with the source of alternating electric power and occurring at a frequency of $f2$ and persisting until the potential of said power source is substantially zero and terminating therewith, and means for impressing the second control signals produced by said second control circuit upon the holding winding of said actuator after said actuator has been moved to the operated position thereof in order to govern the movements of said actuator from its operated to its restored positions at the frequency $f2$ and so that said actuator is returned to its restored position when the potential of said power source is substantially zero, whereby said power switch is operated substantially synchronously with said actuator and is thus returned into its open position when the potential of said power source is substantially zero so as to minimize arcing therein.

4. In an electric heating system including an electric heater, a temperature sensing unit arranged to sense the temperature of a medium heated by said heater, a manually operable controller selectively operative to set different desired temperatures of the medium heated by said heater, and a source of alternating electric power having a frequency $f1$; the combination comprising a power switch operative between an open position disconnecting said heater from said source and a closed position connecting said heater to said source, an electromagnetic actuator including a winding and having a restored position actuating said power switch into its open position and an operated position actuating said power switch into its closed position and having a restoration time that is a small proportion of a cycle of the frequency $f1$, a first control circuit operated from said power source and jointly governed by said temperature sensing unit and said controller and operative to produce output signals having a predetermined time phase delay with respect to the corresponding half cycles of the power source that is inversely proportional to the difference between the temperature sensed by said temperature sensing unit and the temperature setting of said controller and occurring at a frequency of $f2$, wherein $f2=Nf1$ and $N=1$ or 2, a signal generating circuit operated by said first control circuit and operative upon the application of the output signals thereto to produce first control signals occurring at a frequency of $f2$ and having a predetermined time phase delay with respect to the corresponding half cycles of the power source and having a duration that is a small proportion of a half cycle of the frequency $f1$, means for impressing the first control signals upon the winding of said actuator in order to move said actuator to its operated position at predetermined points during the corresponding half cycle of the frequency $f1$, a second control circuit operated from said power source and operative to produce second control signals in phase with the source of alternating electric power and occurring at a frequency of $f2$ and persisting until the potential of said power source is substantially zero and terminating therewith, and means for impressing the second control signals produced by said second control circuit upon the winding of said actuator in order to hold said actuator in the operated position thereof subsequent to the application of the first control signals thereto and to permit movement of said actuator to its restored position when the potential of said power source is substantially zero, whereby said power switch is operated substantially synchronously with said actuator and is thus returned into its open position when the potential of said power source is substantially zero so as to minimize arcing therein.

5. In an electric heating system including an electric heater, a temperature sensing unit arranged to sense the temperature of a medium heated by said heater, a manually operable controller selectively operative to set different desired temperatures of the medium heated by said heater, and a source of alternating electric power having a frequency $f1$; the combination comprising a power switch operative between an open position disconnecting said heater from said source and a closed position connecting said heater to said source, an electromagnetic actuator including a winding and having a restored position actuating said power switch into its open position and an operated position actuating said power switch into its closed position and having a restoration time that is a small proportion of a cycle of the frequency $f1$, a capacitor charging circuit including a charging capacitor and operated from said power source and having the charging rate thereof jointly governed by said temperature sensing unit and said controller and operative to charge said capacitor toward a predetermined potential at a rate that is proportional to the difference between the temperature sensed by said temperature sensing unit and the temperature setting of said controller, a discharge circuit for said capacitor including a breakdown device characterized by conduction therethrough in response to the application of the predetermined potential thereacross from said capacitor and operative upon conduction thereof to produce first control signals occurring at a frequency $f2$ and having a predetermined time phase delay with respect to the corresponding half cycles of the frequency $f1$ that is inversely proportional to the difference between the temperature sensed by said temperature sensing unit and the temperature setting of said controller, wherein $f2=Nf1$ and $N=1$ or 2, means for impressing the first control signals produced by said first control circuit upon the winding of said actuator in order to move said actuator to its operated position, a second control circuit operated from said power source and operative to produce second control signals in phase with the source of alternating electric power and occurring at a frequency of $f2$ and persisting until the potential of said power source is substantially zero and terminating therewith, and means for impressing the second control signals produced by said second control circuit upon the winding of said actuator upon application of said first control signals thereto in order to hold said actuator in the operated position thereof subsequent to the application of said first control signals thereto and to permit movement of said actuator to its restored position when the potential of said power source is substantially zero, whereby said power switch is operated substantially synchronously with said actuator and is thus returned into its open position when the potential of said power source is substantially zero so as to minimize arcing therein.

6. In an electric heating system including an electric heater, a temperature sensing unit arranged to sense the temperature of a medium heated by said heater, a manually operable controller selectively operative to set different desired temperatures of the medium heated by said heater, and a source of alternating electric power having a frequency $f1$; the combination comprising a power switch operative between an open position disconnecting said heater from said source and a closed position connecting said heater to said source, an electromagnetic actuator including a winding and having a restored position actuating said power switch into its open position and an operated position actuating said power switch into its closed position and having a restoration time that is a small proportion of a cycle of the frequency $f1$, a capacitor charging circuit including a charging capacitor having the charging rate thereof jointly governed by said temperature sensing unit and said controller, a source of pulsating D.C. voltage clipped to provide a constant maximum amplitude thereof operated from said power source and connected as the charging potential for said charging circuit to cause said charging capacitor to charge toward a predetermined potential at a rate that is proportional to the difference between the temperature sensed by said temperature sensing unit and the temperature setting of said controller, a discharge circuit for said capacitor including a breakdown device characterized by conduction therethrough in response to the application of the predetermined potential thereacross from said capacitor and a rectifier poled to permit conduction through said discharge circuit only in a direction to discharge said capacitor and operative upon conduction thereof to produce first control signals occurring at a frequency $f2$ and having a predetermined time phase delay with respect to the corresponding half cycles of the power source and inversely proportional to the difference between the temperature sensed by said temperature sensing unit and the temperature setting of said controller, wherein $f2=Nf1$ and $N=1$ or 2, means for impressing said first control signals upon the winding of said actuator in order to move said actuator to its operated position at a predetermined point during the corresponding half cycle of the frequency $f1$, a control circuit operated from said power source and operative to produce second control signals in phase with the source of alternating electric power and occurring at a frequency of $f2$ and persisting until the potential of said power source is substantially zero and terminating therewith, and means for impressing the second control signals produced by said control circuit upon the winding of said actuator upon application of the first control signals thereto in order to hold said actuator in the operated position thereof subsequent to the application of the first control signals thereto and to permit movement of said actuator to its restored position when the potential of said power source is substantially zero, whereby said power switch is operated substantially synchronously with said actuator and is thus returned into its open position when the potential of said power source is substantially zero so as to minimize arcing therein.

7. The electric heating system combination set forth in claim 6, wherein said source of the pulsating D.C. voltage includes a resistor shunted by a Zener diode, and said breakdown device is a Shockley diode.

8. The electric heating system combination set forth in claim 6, wherein said source of pulsating D.C. voltage includes a resistor shunted by a first gaseous discharge tube and said breakdown device is a second gaseous discharge tube.

9. In an electric heating system including an electric heater, a temperature sensing unit arranged to sense the temperature of a medium heated by said heater, a manually operable controller selectively operative to set different desired temperatures of the medium heated by said heater, and a source of alternating electric power having a frequency $f1$; the combination comprising a power switch operative between an open position disconnecting said heater from said source and a closed position connecting said heater to said source, an electromagnetic and an operated position actuating said power switch actuator including a winding and having a restored position actuating said power switch into its open position into its closed position and having a restoration time that is a small proportion of a cycle of the frequency $f1$, a capacitor charging circuit including a charging capacitor and a variable impedance in said charging circuit jointly governed by said temperature sensing unit and said controller and having an impedance inversely proportional to the difference between the temperature sensed by said temperature sensing unit and the temperature setting of said controller, a source of pulsating D.C. voltage clipped to provide a constant maximum amplitude therefor and operated from said power source and connected as the charging potential for said charging circuit, a discharge circuit for said capacitor including a breakdown device characterized by conduction therethrough in response to the application of a predetermined potential thereacross from said capacitor and operative upon conduction thereof to produce control signals occurring at a frequency $f2$ and having a predetermined time phase delay with respect to the corresponding half cycles of the power source that is inversely proportional to the difference between temperature sensed by said temperature sensing unit and the temperature setting of said controller, wherein $f2=Nf1$ and $N=1$ or 2, means for impressing the first control signals produced by said discharge circuit upon the winding of said actuator in order to move said actuator to its operated position at predetermined points during the corresponding half cycles of the frequency $f1$, a control circuit operated from said power source and operative to produce second control signals in phase with the source of alternating electric power and occurring at a frequency of $f2$ and persisting until the potential of said power source is substantially zero and terminating therewith, and means for impressing the second control signals produced by said control circuit upon the winding of said actuator in order to hold said actuator in the operated position thereof subsequent to the application of the first control signals thereto and to permit movement of said actuator to its restored position when the potential of said power source is substantially zero, whereby said power switch is operated substantially synchronously with said actuator and is thus returned into its open position when the potential of said power source is substantially zero so as to minimize arcing therein.

10. In an electric heating system including an electric heater, a temperature sensing unit arranged to sense the temperature of a medium heated by said heater, a manually operable controller selectively operative to set different desired temperatures of the medium heated by said heater, and a source of alternating electric power having a frequency $f1$; the combination comprising a power switch operative between an open position disconnecting said heater from said source and a closed position connecting said heater to said source, an electromagnetic actuator including a winding and having a restored position and an operated position actuating said power switch into its closed position and having a restoration time that is a small proportion of a cycle of the frequency $f1$, a capacitor charging circuit operated from said power source and including a charging capacitor and a variable impedance device therein, a temperature sensing network including said temperature sensing unit and said controller and operative to produce output signals therefrom proportional to the difference between the temperature sensed by said temperature sensing unit and the temperature setting of said controller, means operated by said temperature sensing network for amplifying the output signals received therefrom and having the output thereof applied to said variable impedance device to control the impedance thereof inversely proportional to the amplitude of the amplified output signals, a discharge circuit for said capacitor including a breakdown device characterized by conduction therethrough in response to the application of a predetermined potential thereacross from said capacitor and operative upon conduction thereof to produce first control signals occurring at a frequency $f2$ and having a predetermined time phase delay with respect to the corresponding half cycles of the power source that is inversely proportional to the difference between the temperature sensed by said temperature sensing unit and the temperature setting of said controller, wherein $f2=Nf1$ and $N=1$ or 2, means for impressing the first control signals upon the winding of said actuator in order to move said actuator to its operated position at predetermined points during the corresponding half cycle of the frequency $f1$, a second control circuit operated from said power source and operative to produce second control signals in phase with the source of alternating electric power and occurring at a frequency of $f2$ and persisting until the potential of said power source is substantially zero and terminating therewith, and means for impressing the second control signals produced by said second control circuit upon the winding of said actuator upon application of the first control signals thereto in order to hold said actuator in the operated position thereof subsequent to the application of the first control signals thereto and to permit movement of said actuator to its restored position when the potential of said power source is substantially zero, whereby said power switch is operated substantially synchronously with said actuator and is thus returned into its open position when the potential of said power source is substantially zero so as to minimize arcing therein.

11. The electric heating system combination set forth in claim 10, wherein said temperature sensing unit includes a resistor consisting essentially of a thermistor having a relatively high resistance when the temperature sensed thereby is relatively low and having a relatively low resistance when the temperature sensed thereby is relatively high.

12. The electric heating system combination set forth in claim 10, wherein said temperature sensing unit and said manually operable controller are portions of a Wheatstone bridge network, and said amplifier means is disposed in the capacitor charging circuit and also serves as said variable impedance device.

References Cited in the file of this patent

UNITED STATES PATENTS

| | | |
|---|---|---|
| 2,822,455 | Molyneaux et al. | Feb. 4, 1950 |
| 2,924,757 | Schaeve | Feb. 9, 1960 |
| 2,958,008 | Bray et al. | Oct. 25, 1960 |
| 2,981,898 | St. John | Apr. 25, 1961 |

UNITED STATES PATENT OFFICE
CERTIFICATE OF CORRECTION

Patent No. 3,018,356            January 23, 1962

Floyd H. Busch et al.

It is hereby certified that error appears in the above numbered patent requiring correction and that the said Letters Patent should read as corrected below.

Column 17, line 31, after "electromagnetic" insert -- actuator including a winding and having a restored position actuating said power switch into its open position --; column 17, lines 34 and 35, strike out "tion actuating said power switch into its open position actuator including a winding and having a restored posi-".

Signed and sealed this 26th day of June 1962.

(SEAL)
Attest:

ERNEST W. SWIDER
Attesting Officer

DAVID L. LADD
Commissioner of Patents